United States Patent

Fleischer et al.

[11] 3,802,972

[45] Apr. 9, 1974

[54] PROCESS FOR MAKING CYLINDRICAL HOLES IN A SHEET MATERIAL

[75] Inventors: Robert L. Fleischer; Paul B. Price, both of Schenectady, N.Y.

[73] Assignee: General Electric Company, Schenectady, N.Y.

[22] Filed: Nov. 12, 1970

[21] Appl. No.: 89,001

Related U.S. Application Data

[63] Continuation of Ser. No. 740,590, June 27, 1968, abandoned.

[52] U.S. Cl............................ 156/7, 156/2, 156/24, 156/272, 161/109, 250/83 CD, 250/83.1
[51] Int. Cl......................... B32b 3/00, B32b 31/14
[58] Field of Search................ 156/2, 7, 8, 24, 272; 161/109; 250/83.1, 83 CD

[56] References Cited
UNITED STATES PATENTS

| | | | |
|---|---|---|---|
| 3,335,278 | 8/1967 | Price et al. | 250/83.1 |
| 3,515,649 | 6/1970 | Hepfer | 204/38 |
| 2,989,385 | 6/1961 | Gianola et al. | 156/8 |
| 3,303,085 | 2/1967 | Price et al. | 156/7 |
| 3,337,462 | 10/1967 | Hoornstra et al. | 156/7 |
| 3,415,993 | 12/1968 | Fleischer et al. | 156/7 |

OTHER PUBLICATIONS

Hurlbut, C. S., Dana's Manual of Mineralogy, Wiley, New York (1952), pages 357 and 358 relied on.

Primary Examiner—George F. Lesmes
Assistant Examiner—Lorraine T. Kendell
Attorney, Agent, or Firm—Jane M. Binkowski; Joseph T. Cohen; Jerome C. Squillaro

[57] ABSTRACT

A process for making substantially cylindrical holes in a solid which contains tracks of radiation damaged material is described. The solid is contacted with a pre-etchant which etches or degrades the tracks of damaged material but has no significant effect on the undamaged material. The solid is then contacted with an etchant which attacks the undamaged material and any degraded or radiation damaged material which may be present. The product is useful as a filter.

2 Claims, 4 Drawing Figures

PATENTED APR 9 1974 3,802,972
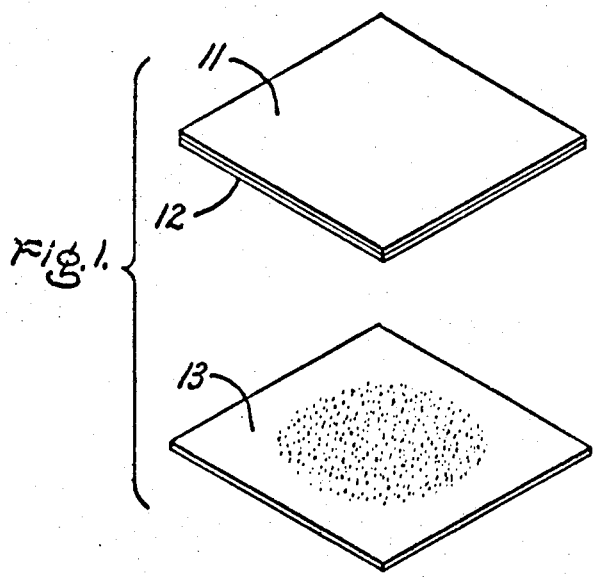
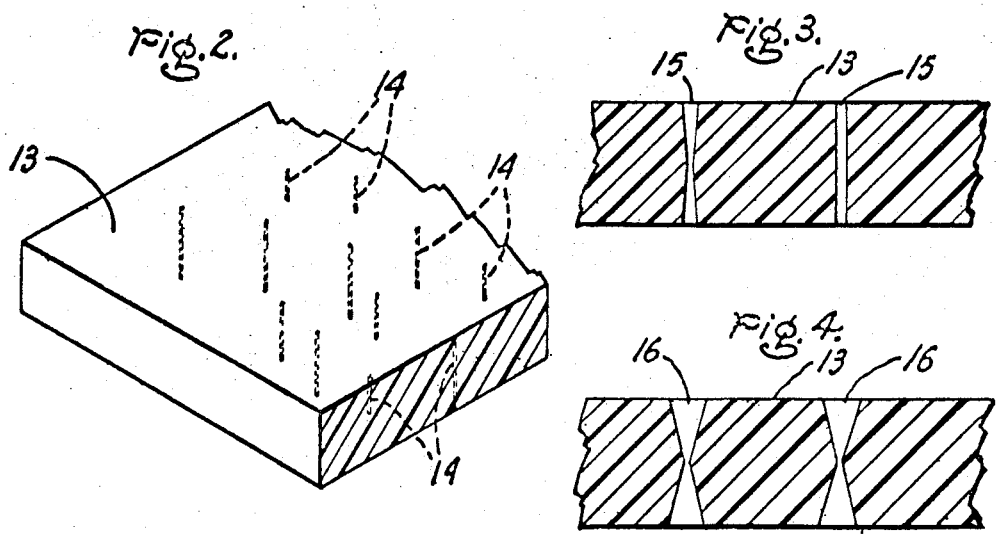

A PROCESS FOR MAKING CYLINDRICAL HOLES IN A SHEET MATERIAL

This is a continuation of application Ser. No. 740,590, filed June 27, 1968, and now abandoned.

Porous bodies or filters having straight-through holes of extremely small diameter and a method of making such porous bodies have been described and claimed in U.S. Pat. No. 3,303,085 — Price et al., Jan. 7, 1967. The method of the aforementioned patent involves a combination of irradiation damage along substantially straight paths and the chemical removal of the damaged material to provide pores or holes. More specifically, a solid is bombarded with heavy energetic particles to produce tracks of radiation damaged material which are removed by etching as by immersing the irradiated solid in an etchant.

While holes formed in this manner are reasonably uniform in diameter throughout their length, there is a tendency in a number of materials for a minimum diameter region to be formed between the mouths of the holes so that the holes have a tapered, longitudinal cross section somewhat like an hourglass. In addition, if the tracks of damaged material end within the solid rather than pass completely through it, the damaged material is etched and the etching prolonged until the remaining undamaged material is penetrated to form a hole. The result may be a tapered hole.

The taper is dictated by the relative rates of attack of a chemical reagent along the damaged track and that on the surrounding undamaged material. For such uses as in filters it is usually desirable to have holes with as little taper as possible.

By the method of the present invention, the irradiated solid is etched to reduce the degree of taper so that substantially cylindrical holes are produced. Specifically, the solid which has previously been subjected to radiation to produce the tracks of damaged material is sequentially contacted with at least two etchants. The first etchant is referred to herein as a pre-etchant. The pre-etchant attacks the tracks of radiation-damaged material, but has no significant effect on the surrounding undamaged portions of the irradiated solid. The pre-etchant may be a reagent which etches the tracks of radiation-damaged material to form narrow, hollow tracks, or it may be a reagent which selectively degrades the damaged material. The second etchant is an etchant for the undamaged material and any degraded material which may be present. The second etchant, in addition to removing any degraded damaged material which may be present, etches the undamaged material to widen the hollowed tracks. The net effect is to produce holes of reduced taper relative to holes produced by a single chemical treatment.

The present invention, together with further objects and advantages thereof, will be better understood from the following description taken in connection with the accompanying drawings, and its scope will be pointed out in the appended claims.

In the drawings:

FIG. 1 is a composite view in perspective illustrating one method of bombarding, i.e. irradiating, a solid in sheet form with charged particles.

FIG. 2 is an enlarged fragmentary view of the irradiated sheet of FIG. 1.

FIG. 3 is a fragmentary enlarged cross-sectional view of a sample of the irradiated sheet after it had been etched by the process of the present invention.

FIG. 4 is a fragmentary enlarged cross-sectional view of a sample of the irradiated sheet after it had been etched in a conventional manner by immersion in a reagent that is an etchant for both the radiation damaged and undamaged material showing the tapered configuration of the resulting holes 16 in the sheet.

One method of irradiating the solid for use in the present process is shown in FIG. 1. A layer 12 of Californium-252 on substrate 11 emits fission fragments, i.e. heavy charged particles which form tracks 14 of radiation damaged material in sheet 13.

Representative of the solids useful in the present invention are natural and synthetic glasses as well as thermosetting and thermoplastic polymers and copolymers. Illustrative of suitable polymers are the polycarbonates disclosed in U.S. Pat. No. 2,946,766. Commercially, these polycarbonates are usually polyesters of bis($\alpha$-hydroxyphenyl) alkanes such as 2,2-bis(4-hydroxyphenyl) propane(Bisphenol A). Additional examples of suitable polymers are polyethylene terephthalate, high density polyethylene, polystyrene, and the cellulose esters such as the nitrate, acetate and butyrate. A typical example of a satisfactory copolymer is the organopolysiloxane-polycarbonate block copolymer disclosed in U.S. Pat. No. 3,189,662.

The solid used in the instant process can have any desired shape. For most applications, it is used in the form of a sheet. A solid which is thermoplastic should be formed into the desired shape by any conventional technique prior to bombardment. The specific thickness of the sheet depends somewhat on its final use. It need only be thick enough to form a continuous film, generally at least a few hundred Angstroms. Its maximum thickness is limited by the range of the bombarding charged particles, and the etchability of the solid itself as well as its track defining portions. For a number of solids, the maximum thickness is about 20 microns or higher if fission fragments are used for track formation.

Any bombarding procedure which will produce the desired tracks in the solid sheet can be used. The process can be carried out in air or in a vacuum. Ions and particles which are generated in beams such as argon and oxygen ions are preferred since they produce substantially aligned tracks in the solid sheet in air or in a vacuum. On the other hand, particles such as Uranium-235 or Californium-252 fission fragments or alpha particles can produce either substantially aligned tracks or random tracks. Improved alignment can be obtained in air with fission fragments by disposing a collimator between the fission fragments and the sheet to allow passage of substantially parallel fragments only.

The particular type of charged particles used to bombard the solid sheet will depend largely on the extent to which they form tracks of damaged material in the solid since some solids are more easily damaged than others. Fission fragments, and ions heavier than alpha particles, such as oxygen ions, will form tracks of damaged material in most polymers. Oxygen ions are effective with polymers such as the polycarbonates, whereas alpha particles are operable with the more easily damageable polymers such as the cellulose esters.

In carrying out the present process, the irradiated solid is contacted with a pre-etchant which penetrates along the tracks of radiation damaged material. The pre-etchant etches or degrades the radiation damaged material but has no significant effect on the undamaged material. The pre-etchant may be a liquid or gas. Preferably, the irradiated solid is immersed in the liquid pre-etchant or suspended in the gaseous pre-etchant so that the entire solid is contacted with the pre-etchant.

The pre-etchant should be used for a time sufficient to etch or degrade the tracks of radiation damaged material. This is determinable empirically by measuring the rate at which the subsequent etch penetrates along the track. Such rate is determinable, for example, by microscopic observation.

The specific pre-etchant used depends on the particular radiation-damaged material to be etched or degraded and is determinable empirically. For the radiation-damaged material of a polycarbonate, for example, a pre-etchant such as sulfur trioxide gas or sulfuric acid is suitable.

The pre-etched solid is then contacted with etchant, preferably it is immersed in the etchant, which etches the undamaged material and any degraded damaged material which may be present. The etched solid should then be rinsed with water to remove the etchant. This second etchant produces a track of reduced taper and widens the holes to form substantially cylindrical holes 15 as shown in FIG. 3. The particular etchant used and its concentration in solution depends on the material to be etched. Typical etchants include hydrofluoric acid, sodium hydroxide, potassium hydroxide and potassium permanganate.

The degree of taper, i.e. cone angle, of a hollowed track or hole is determinable from the rate of etching of the track and the rate of increase of the radius of the etched track. The irradiated solid is initially etched for a specific short period of time. The solid is then rinsed with neutralizer or water to stop the etching action and the depth of the hollowed tracks is measured. The partially etched solid is then etched again in the same manner for a second specific period of time significantly longer than the initial etching period. The etched solid is again rinsed with neutralizer or water to stop the etching action and the diameter of the hollowed tracks is measured. The cone angle is given by $\arcsin(v_G/v_T)$ where $v_T$ is the linear rate of attack along the track, as found from the shorter etch and $v_G$ is the rate of increase of the track radius, as found by the longer etch.

A surfactant may be added to the pre-etchant or etchant to improve their wetting characteristics and to lower the cone angle. The particular surfactant used may be cationic, anionic or non-ionic and depends largely on the particular pre-etchant or etchant and the solid to be treated. The etchant or pre-etchant should not decompose or degrade the surfactant significantly. The amount of surfactant used is not critical and may vary within a wide range depending on the wetting characteristics desired. Generally, satisfactory results are obtained with amounts of surfactant ranging from about 0.01 to about 2 percent by volume of the etchant. Representative of the anionic surfactants are sodium salts of organic sulfonates, especially alkylaryl sulfonates such as the sulfonates of dodecylbenzene as, for example, disodium-4-dodecylated oxydibenzenesulfonate. Other representative anionic surfactants include sodium alkylnaphthalenesulfonate, sodium N-methyl-N-oleyltaurate, sodium oleylisethionate and the sodium salt of sulfated nonyl phenoxypoly(ethyleneoxy) ethanol. Typical cationic surfactants include lauryltrimethylammonium chloride and octadecyltrimethylammonium chloride. Examples of nonionic surfactants are polyethylene glycol lauryl ether and tris(polyoxyethylene) sorbitan monolaurate. Fluorochemical surfactants, which may be nonionic, cationic or anionic, can also be used. A typical anionic fluorochemical surfactant includes a perfluoroalkyl chain in the surfactant molecule.

The process of the present invention is an accelerated etching technique. It makes possible the use of thinner films since length of contact with the etchant which etches the undamaged areas of the irradiated solid is significantly shortened. It also makes possible longer etched tracks in irradiated films of a given thickness. Since the resulting holes are substantially cylindrical throughout their length, they are less like to clog when the material is used as a filter.

Filters made from the etched product of the present invention are useful for separating materials of a very small size, as for example, various sized molecules of proteins, polymers and viruses. They are also useful in water purification.

All parts used herein are by volume unless otherwise noted.

The invention is further illustrated by the following examples.

The holes in the sheets of the following examples were measured through a high powered microscope which was calibrated by looking at a finely ruled scale.

EXAMPLE I

A film of Lexan polycarbonate resin, which is a polycarbonate of Bisphenol A, having a thickness of about 16 microns was used. The film had been irradiated with Californium-252 fission fragments for ¼ hour to produce a track density of $10^5/cm^2$. The irradiation was carried out in a vacuum of 1 mm Hg.

The pre-etchant was comprised of 98 parts concentrated sulfuric acid, one part ethanol, and 1 part Alipal CO-433 surfactant which is the sodium salt of sulfated nonylphenoxypoly (ethyleneoxy) ethanol.

The etchant was comprised of 6.25N sodium hydroxide solution containing 1% Benax 2A1 surfactant (45% active) which is disodium 4-dodecylated oxydibenzenesulfonate.

The pre-etchant and etchant were heated to 50°C and maintained at this temperature.

A sample of the polycarbonate resin film was immersed in the pre-etchant for 6 minutes, rinsed with water and dried in air. The pre-etched film was examined with a high-powered microscope but no hollow tracks were visible.

The pre-etched film was immersed in the etchant for 8 minutes, then rinsed with water, dried in air, and again examined with a high powered microscope. Hollow tracks were visible which passed completely through the film and which were visibly substantially cylindrical in form. These holes measured 17 (±1) microns in length.

A second sample of the same polycarbonate resin film was pre-etched and etched as described above except that the film was immersed in the pre-etchant for one minute. Under the high powered microscope, hollow tracks which passed completely through the film and which were substantially cylindrical were visible. These holes also measured 17 (±1) microns in length. In this instance, therefore, a pre-etching period as short as one minute degraded the material sufficiently.

The above procedure was repeated with another film sample except that no pre-etchant was used and the film was immersed in the etchant for 8 minutes. The resulting hollowed tracks measured 6 microns in length and were not as cylindrical as those above treated with pre-etchant.

EXAMPLE II

Lexan polycarbonate resin film having a thickness of about 16 microns was used.

The film had been irradiated with Californium-252 fission fragments for ¼ hour to produce a track density of about $10^5/cm^2$. The irradiation was carried out in air.

The pre-etchant was sulfur trioxide vapor above fuming sulfuric acid which was maintained in a closed container at room temperature.

The etchant was comprised of 6.25N sodium hydroxide solution containing 0.1 percent Benax 2A1 surfactant (45 percent active). The etchant was maintained at a temperature of 50°C.

A sample of the irradiated polycarbonate film was suspended in the sulfur trioxide for 60 minutes, rinsed with water and dried in air. The pre-etched film was examined with a high-powered microscope but no hollow tracks were visible.

The pre-etched film was immersed in the etchant for 8 minutes, then rinsed with water, dried in air, and again examined with a high powered microscope. Hollow tracks were visible which were substantially cylindrical in form. These holes measured 12 microns in length and the cone angle, i.e. degree of taper, measured 0.35°.

A second sample of the irradiated polycarbonate film was pre-etched with the film suspended in the pre-etchant for 140 minutes and etched for 6 minutes. Under the high powered microscope, hollow tracks were visible which passed completely through the film and which were substantially cylindrical. These holes also measured 12 microns in length, and the cone angle measured 0.35°.

The above procedure was repeated with another film sample except that the pre-etching period was 6 minutes and the film was immersed in the etchant for 8 minutes. The resulting hollowed tracks measured 13 microns in length. The cone angle measured 0.6°.

The above procedure was repeated with another film sample except that no pre-etchant was used and the film was immersed in the etchant for 8 minutes. The resulting hollowed tracks measured 6 microns in length. The cone angle measured 0.6°.

In this instance, the six minute pre-etching had no effect, whereas the 140 minute and 60 minute pre-etchings had the substantially equivalent effect of reducing the cone angle to 0.35°.

What we claim as new and desire to secure by Letters Patent of the United States is:

1. An accelerated process for making substantially cylindrical holes in a solid sheet of polycarbonate having a maximum thickness of 20 microns suitable as a filter for separating molecules which comprises bombarding a surface of said sheet with fission fragments to form tracks of radiation damaged material in said sheet extending through said sheet from the bombarded surface through the opposite surface, contacting the bombarded sheet with a pre-etchant selected from the group consisting of sulfuric acid and sulfur trioxide gas to degrade said tracks of damaged material therein without affecting the undamaged portion of said sheet, contacting the resulting pre-etched sheet with an etchant fluid selected from the group consisting of hydrofluoric acid, sodium hydroxide, potassium hydroxide and potassium permanganate to dissolve and remove all of said tracks of damaged material to produce substantially cylindrical holes through said sheet.

2. An accelerated process for making substantially cylindrical holes in a solid sheet according to claim 1 wherein said etchant is 6.25 Normal sodium hydroxide.

* * * * *